US006616495B1

(12) United States Patent
Tsuboi

(10) Patent No.: US 6,616,495 B1
(45) Date of Patent: *Sep. 9, 2003

(54) FILMING METHOD OF CARBON NANOTUBE AND THE FIELD EMISSION SOURCE USING THE FILM

(75) Inventor: Toshiyuki Tsuboi, Mobara (JP)

(73) Assignee: Futaba Denshi Kogyo Kabushiki Kaisha, Chiba (JP)

(*) Notice: Subject to any disclaimer, the term of this patent is extended or adjusted under 35 U.S.C. 154(b) by 0 days.

This patent is subject to a terminal disclaimer.

(21) Appl. No.: 09/484,693

(22) Filed: Jan. 18, 2000

(30) Foreign Application Priority Data

Jan. 18, 1999 (JP) ............................................ 11-008690

(51) Int. Cl.[7] .............................. H01J 9/00; H01J 9/02; H01J 1/304
(52) U.S. Cl. ........................... 445/24; 445/46; 313/309; 313/310; 313/311
(58) Field of Search .......................... 445/24; 313/309, 313/310, 336, 351, 422

(56) References Cited

U.S. PATENT DOCUMENTS 5,560,898 A * 10/1996 Uchida et al. ............... 423/461
6,097,138 A * 8/2000 Nakamoto ................... 313/309
6,149,775 A * 11/2000 Tsuboi et al. ................ 204/173
6,232,706 B1 * 5/2001 Dai et al. .................... 313/309

FOREIGN PATENT DOCUMENTS

JP        00263609        9/1999

OTHER PUBLICATIONS

Philip G. Collins and A. Zettl, "A Simple and robust electron beam source from carbon nanotubes" American Institute of Physics, Sep. 23, 1996, Appl. Phys. Lett. 69(13).
A. G. Rinzler, J. H. Hafner, P. Nikolaev, L. Lou, S. G. Kim, D. Tomanek, P. Nordlander, D. T. Colbert and R. E. Smalley, "Unraveling Nanotubes: Field Emission from an Atomic Wire" Science, Sep. 15, 1995, vol. 269, pp. 1550–1553.
Walt A. de Heer, W. S. Bacsa, A. Chatelain, T. Gerfin, R. Humphrey-Baker, L. Forro and D. Ugarte, "Alinged Carbon Nanotube Films: Production and Optical and Electonic Properties" Science, May 12, 1995, vol. 268, pp. 845–846.
Walt A. de Heer, Chatelain and D. Ugarte, "A Carbon Nanotube Field-Emission Electron Source" Science, Nov. 17, 1995, vol. 270, pp. 1179–1180.

* cited by examiner

Primary Examiner—Kenneth J. Ramsey
Assistant Examiner—Karabi Guharay
(74) Attorney, Agent, or Firm—Katten Muchin Zavis Rosenman

(57) ABSTRACT

A method for filming a carbon nanotube film comprising the steps of preparing a solution having a solvent into which a coarse carbon nanotube is dispersed, evaporating the solvent, disposing a substrate in the solution, the substrate having an exposed portion patterned into a predetermined shape, and depositing a carbon nanotube on the exposed portion of the substrate.

14 Claims, 7 Drawing Sheets

(SINGLE-WALLED CARBON NANOTUBE FORMING CONDITION;
Ni-Y ADDED ELECTRODE DC150A 500Torr
TEST CONDITION $2 \times 10^{-7}$ Torr)

I-V CHARACTERISTIC GRAPH (FN PLOT)
FIELD EMISSION ELECTRON SOURCE USING A CRUDE, COARSE CARBON NANOTUBE

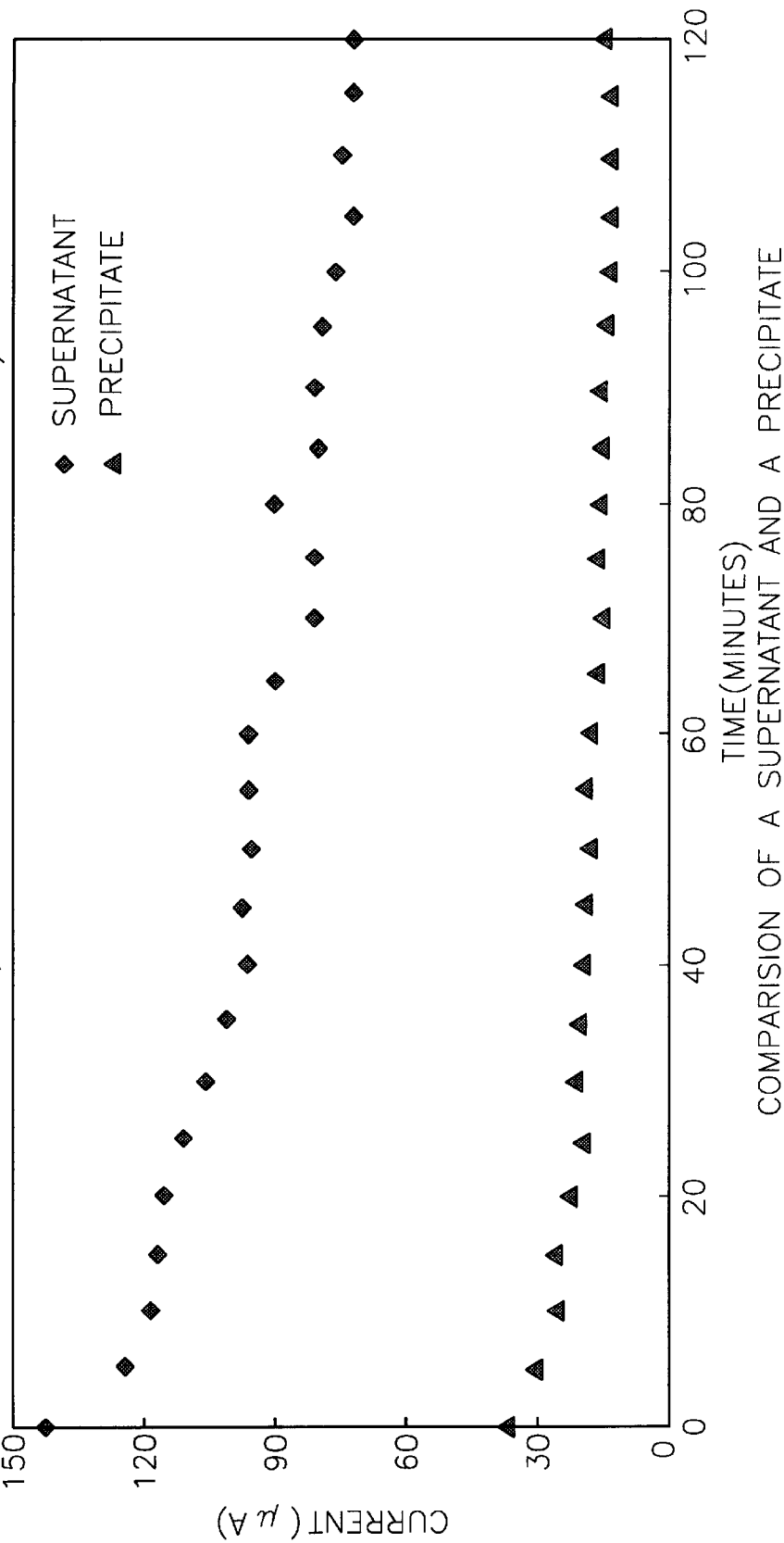

I-V CHARACTERISTIC GRAPH

FN PLOT
FIELD EMISSION ELECTRODE SOURCE OF A
CARBON NANOTUBE FILM (SINGLE-WALLED CARBON NANOTUBE FORMING CONDITION; Ni-Y ADDED ELECTRODE AC180A 500Torr TEST CONDITION $2\times10^{-7}$ Torr)

APPLIED VOLTAGE 750V

APPLIED VOLTAGE 1500V
GRAPHS OF A CURRENT VERSUS TIME OF A FIELD EMISSION ELECTRODE SOURCE

FILMING METHOD OF CARBON NANOTUBE AND THE FIELD EMISSION SOURCE USING THE FILM

FIELD OF THE INVENTION

The present invention relates to a method for forming carbon nanotube films, carbon nanotube films obtained by using the foregoing method, and a field emission electron source using the carbon nanotube films.

BACKGROUND OF THE INVENTION

In comparison with an electron source using a thermal energy (a thermal electron emission source), a field emission electron source, because of its longer life, is often used as a power saving energy source. The field emission electron source is made of, for example, a tungsten, a silicon, a molybdenum, etc.

The field emission electron source must be provided with a sharp tip for it is at the tip at which an electric field is focused. However, it is difficult to sharpen the tip of a metallic material such as tungsten. In addition, in order for the field emission electron source to maintain the tip sharpness, it is necessary to keep an interior of an electron tube under a high vacuum of more than $10^{-8}$ Torr. That is, it is difficult not only to manufacture such a field emission electron source made of a metallic material but also an electron tube therefor.

Recently, as a material to overcome the above-mentioned shortcomings, carbon nanotubes have been investigated. Since the carbon nanotube is chemically stable, has a sufficient mechanical stiffness, and has an enough sharpness to focus the electric field, it is ideally suited to be used as a field emission electron source.

The carbon nanotube is classified into a multi-walled carbon nanotube and a single-walled carbon nanotube. As known from their names, the multi-walled carbon nanotube is composed of two or more walled concentric cylinders, and the single-walled nanotube is composed of one walled cylinders. The multi-walled carbon nanotube has a closed tip and the single-walled carbon nanotube has an open tip. Of the two, the multi-walled carbon nanotube is mainly used as the field emission electron source.

The multi-walled carbon nanotube can be obtained by a DC arc-discharge using a pair of pure carbon electrodes under a gas atmosphere. To be more specific, the arc-discharge evaporates a positive carbon electrode to form soots and negative deposits, the negative deposits incorporating therein the multi-walled carbon nanotubes.

It has been disclosed in P. G. Collins et al., Appl. Phys. Lett69(13)23, Sep. (1996)., p1969 that, in order to use the multi-walled carbon nanotube as the field emission electron source, the obtained multi-walled carbon nanotube must be solidified by an epoxy resin without undergoing a separating and a refining processes.

However, it has been disclosed in Smally et al., Science vol.269, 1550(1995) that the multi-walled carbon nanotube with its tip opened by the separating and the refining processes is suitable for use as the field emission electron source since it has a low threshold and a large electric current density. The separating and the refining processes are carried out as follows: first coarse multi-walled carbon nanotubes are pulverized using a mortar, are dispersed in ethanol, and are sonicated; the ethanol in which the coarse multi-walled carbon nanotubes are dispersed is filtered and then is dried; the dried materials are passed through a sieve; and the sieved materials are heated and combusted on a quartz glass using a burner.

The multi-walled carbon nanotube separated and refined in the above-mentioned manner, since it has a high purity and an opened tip, is suitable for use as the field emission electron source.

In order to use the multi-walled carbon nanotube as the field emission electron source, it is preferable that the multi-walled carbon nanotube is a film form. The method for forming a multi-walled carbon nanotube film is disclosed in Walt A. de Heer, et al., Science 268(1995)845. To be more specific, after filtering the separated and the refined multi-walled carbon nanotube, it is passed through a ceramic filter having a plurality of openings, each of the openings having 0.2 μm diameter, and then is deposited on a Teflon or an aluminum foil. Further, there is disclosed in Science 270 (1995) 1179 the experimental analysis of the field emission electron using the multi-walled carbon nanotube film obtained by the foregoing method.

In addition to the separating and the refining processes being cumbersome, the recovery ratio of the multi-walled carbon nanotube to the consumption of the raw material is not high enough making the field emission electron source using the multi-walled carbon nanotube expensive and unsuitable for mass production.

In addition, the method for forming the carbon nanotube film according to Walt A. de Heer, et al. is not suitable for the single-walled carbon nanotube. To be more specific, since, unlike the multi-walled carbon nanotube, the single-walled carbon nanotube is flexible and gets bundled easily, it does not render itself to be captured by openings of the ceramic filter and is difficult to be deposited.

Further, in order to form the field emission electron sources for various uses, it is necessary to pattern the carbon nanotube into predetermined shapes in film form. This, however, is extremely difficult.

SUMMARY OF THE INVENTION

It is, therefore, a primary object of the present invention to provide a method for carbon nanotube films whereby the usual separating and the refining processes are eliminated, enabling a field emission electron source to be provided at a lower cost.

It is an another object of the present invention to provide a method suitable for forming a single-walled carbon nanotube film.

In accordance with one aspect of the present invention, there is provided a method for forming a carbon nanotube film, the method comprising the steps of: dispersing a solution having a solvent into which a coarse carbon nanotube is dispersed, evaporating the solvent, disposing a substrate in the solution, the substrate having an exposed portion patterned into a predetermined shape, and depositing a carbon nanotube on the exposed portion of the substrate.

In accordance with another aspect of the present invention, there is provided a method for forming a carbon nanotube film, the method comprising the steps of: preparing a solution having a solvent into which a coarse carbon nanotube is dispersed, preparing a substrate having an exposed portion patterned into a predetermined shape, scattering the solution to the exposed portion of the substrate using a scattering means, and depositing a carbon nanotube on the exposed portion of the substrate by evaporating the solvent.

In accordance with further another aspect of the present invention, there is provided a carbon nanotube filmed by using the foregoing methods.

In accordance with further another aspect of the present invention, there is provided a field emission electron source made of a carbon nanotube filmed by using the foregoing methods.

BRIEF DESCRIPTION OF THE DRAWINGS

The above and other objects and features of the present invention will become apparent from the following description of the preferred embodiments given in conjunction with the accompanying drawings, wherein:

FIG. 5 depicts a characteristic graph of a field emission electron source manufactured by using a supernatant and a precipitate in accordance with the present;

DETAILED DESCRIPTION OF THE PREFERRED EMBODIMENTS

The typical single-walled carbon nanotube is manufactured by the following processes. Similar to the manufacture of the multi-walled carbon nanotube, the single-walled carbon nanotube is obtained by carrying out a DC arc-discharge using a pair of pure carbon electrodes under a gas atmosphere. However, unlike the multi-walled carbon nanotube, in the manufacture of the single-walled carbon nanotube, the carbon electrode into which a metal such as nickel, yttrium, et al is added is used as a positive electrode, the foregoing metal functioning as a catalyst. The arc-discharge allows the positive carbon electrode to form soot and a negative deposit, the soot incorporating therein the single-walled carbon nanotube.

The coarse single-walled carbon nanotube manufacturing method for improving a recovery ratio thereof has been disclosed in greater detail in a copending, commonly owned application, Japan. Filling No.10-82409. In comparison with the manufacture of the multi-walled carbon nanotube, this method makes it possible to obtain the single-walled carbon nanotube at a lower cost and in a larger quantity, enabling a field emission electron source to be formed at a lower cost, when the single-walled carbon nanotube is to used as the field emission electron source.

Figure 1A:
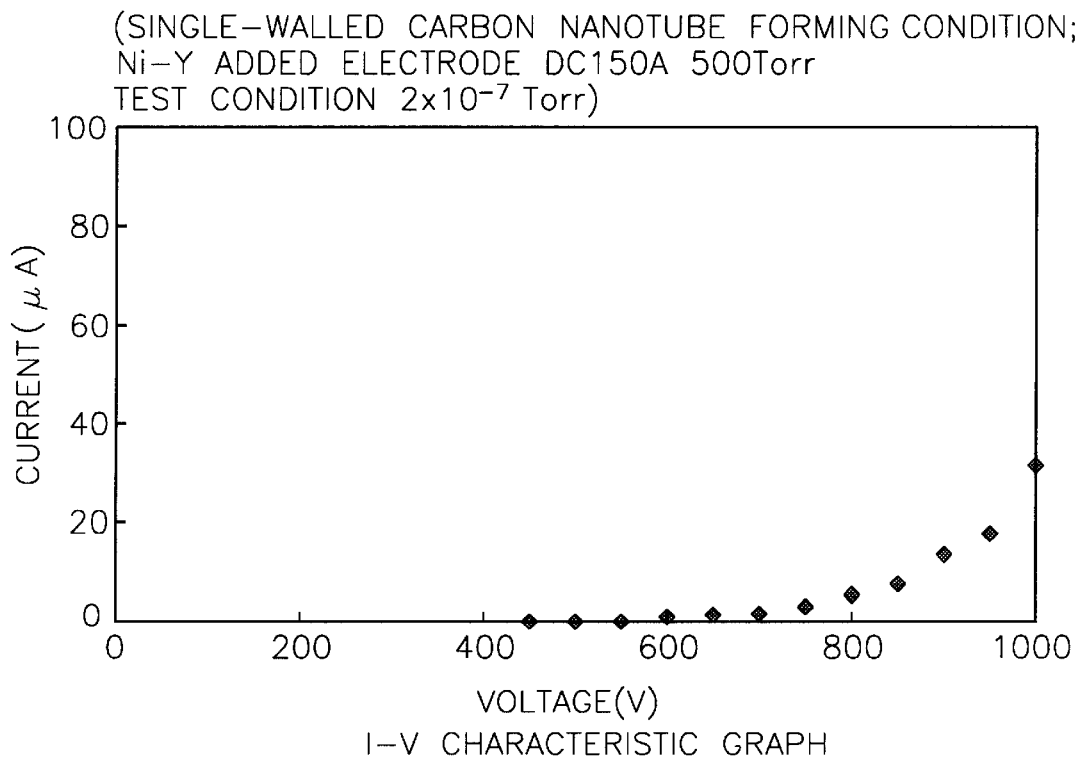
FIGS. 1A and 1B describe characteristic graphs of a diode structure using a crude, coarse carbon nanotube.
Figure 1B:
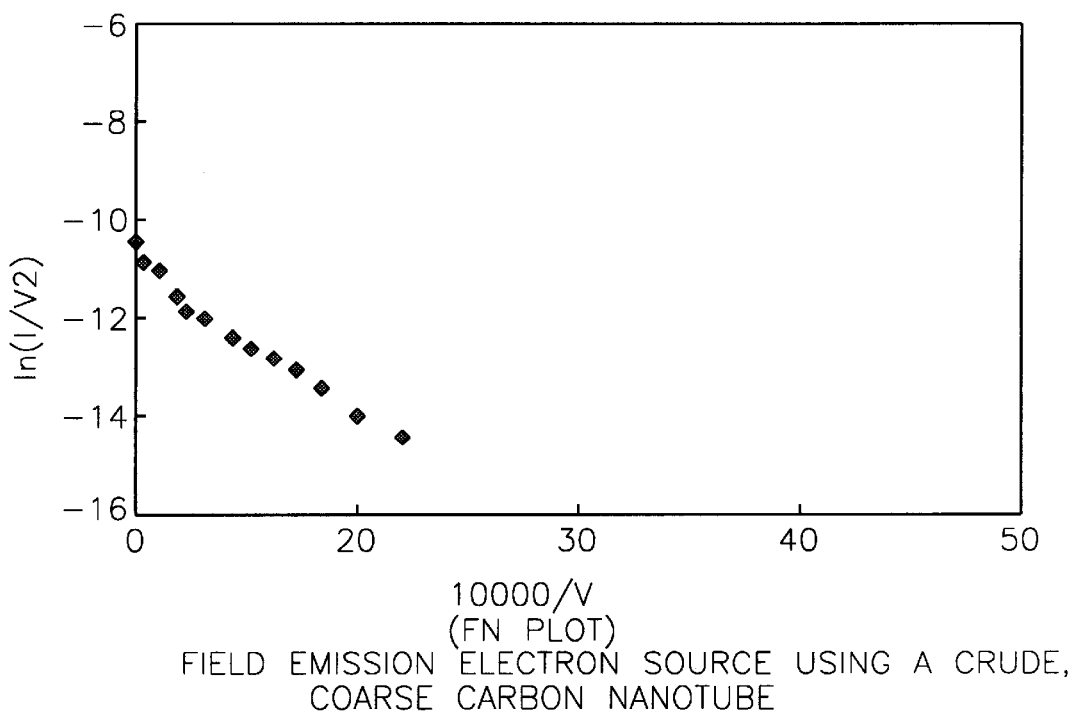

It has been found that, as clearly seen from FIGS. 1a and 1b, the field electrons are emitted from the crude, coarse single-walled carbon nanotube.

There are shown in FIGS. 1a and 1b current (I)-voltage (V) characteristic graph, and Fauler-Nordheim plot, respectively. As shown, the flow of the current is detected from the vicinity of 500V and FN plot is substantially linear having a negative slot. Therefore, it is apparent that the field electrons are emitted.

However, since it is difficult to process the crude, coarse single-walled carbon nanotube itself, it is preferable that the crude, coarse single-walled carbon nanotube is treated and deposited on a substrate, i.e. filmed. Further, if the voltage is applied under the single-walled carbon nanotube not stuck to the substrate, it is pulled to both pole plates, thereby causing a change of its characteristics or a short.

The coarse single-walled carbon nanotube is treated and deposited on the substrate as follows. First, after preparing a container such as a beaker, at an inside bottom of the container is installed a conductive substrate (a conductive plate) such as a metal plate or a carbon sheet. Next, the coarse single-walled carbon nanotube and a solvent such as acetone are poured into the container. Subsequently, after the container is sonicated, the container is put into a draft chamber. In the draft chamber, the solvent in the container is evaporated naturally. As a result, the coarse single-walled carbon nanotube is stuck to and gets deposited, uniformly, on a surface of the substrate. The single-walled carbon nanotube film obtained by the foregoing manner is so adhered closely to the substrate that, even if a strong vibration is applied to the substrate, it does not get detached from the substrate.

The method for forming the carbon nanotube film in a predetermined pattern in accordance with a first preferred embodiment will be described.

Figure 2:
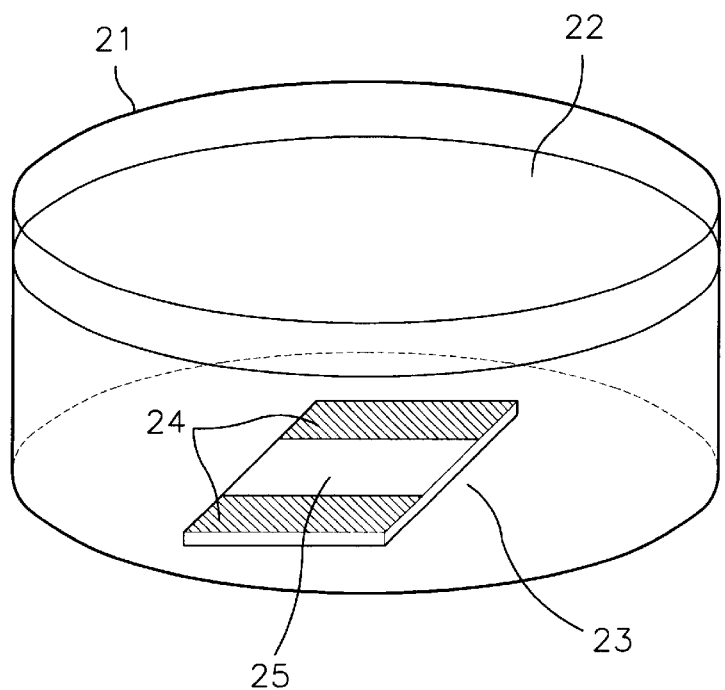
FIG. 2 shows a perspective view setting forth a method for forming a carbon nanotube film into a predetermined pattern in accordance with a first preferred embodiment of the present invention.

In FIG. 2, reference number 21 designates a container such as a beaker, 22 is a solution in which the carbon nanotube obtained after dispersing the coarse carbon nanotube into the solvent such as acetone is dispersed, 23 shows a conductive substrate (a conductive plate) such as copper, and 24 presents an adhesive tape to be stuck to the substrate as a make. By covering the adhesive tape 24 on a portion of top of the substrate 23, the top of the substrate 23 is formed with an exposed portion 25 having a predetermined pattern.

When the carbon nanotube film in the predetermined pattern is manufactured, at the inside bottom of the beaker 21 is installed the substrate 23 to which the adhesive tape 24 is stuck in the predetermined pattern. On the other hand, in order to obtain a supernatant including the carbon nanotube, the coarse carbon nanotube and the solvent such as the acetone are put in a separate beaker (not shown) and then the beaker is sonicated. After about ten minutes, the supernatant in the beaker is recovered. The recovered supernatant solution 22 is put in the beaker 21 and then is evaporated, for example, in the draft chamber. As a result, the coarse single-walled carbon nanotube is stuck to and is uniformly deposited on the substrate 23 and the adhesive tape 24. Thereafter, by removing the adhesive tape 24 from the substrate 23, the carbon nanotube film is formed only on the exposed portion 25 of the substrate 23.

By patterning the exposed portion 25 into various shapes such as symbols, characters, it is possible to form the carbon nanotube film having various patterns. In addition, since it is possible to form the carbon nanotube film in various patterns, when it is used as the field electron emission source, it becomes unnecessary to form the conductive pattern of the substrate 23 in the predetermine shape and it makes it possible to use the plane electrode.

Figure 3:
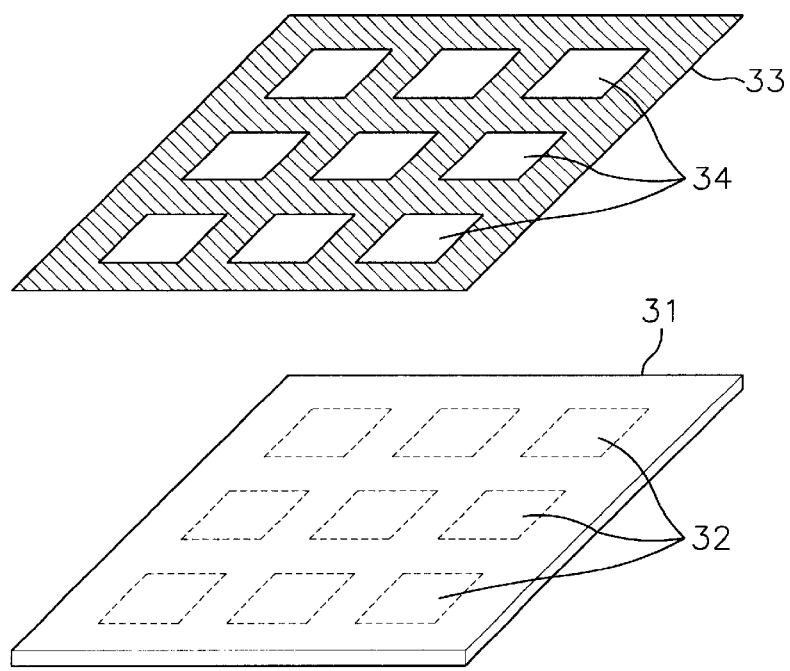
FIG. 3 illustrates a perspective view setting forth a method for forming a carbon nanotube film into a predetermined pattern in accordance with a second preferred embodiment of the present invention.

There is shown in FIG. 3 a method for forming the carbon nanotube film on the substrate having the predetermined pattern in accordance with a second preferred embodiment.

In FIG. 3, reference numeral 31 designates a conductive substrate (a conductive plate) such as a copper and 33 is a mask made of a ceramic. The mask 33 is formed with a plurality of through-holes 34, for example, nine rectangular through-holes.

In the manufacture for the carbon nanotube film having a predetermined pattern, after the mask 33 is disposed on the substrate 31, the mask 33 and the substrate 31 are installed at the inside bottom of the beaker. In this case, as shown by a broken line, the top portions of the substrate 31 corresponding to the through-holes 34 of the mask 33 are not covered with the mask 33 and the exposed portion 32 having the rectangular shape is formed on the substrate 31.

On the other hand, a supernatant which is separately obtained after putting another coarse single-walled carbon nanotube and a solvent (not shown) such as acetone into a beaker (not shown) is poured into the beaker in which the substrate 31 and the mask 33 are disposed, and then evaporated naturally. As a result, the coarse single-walled carbon nanotube is stuck to and deposited uniformly on the exposed portion 32 of the substrate 31 and the mask 33. Thereafter, by removing the mask 33, it is possible to obtain the carbon nanotube film only on the exposed portion 32 of the substrate 31.

By patterning the through-holes into the various shapes such as symbols, characters, it is possible to obtain the carbon nanotube film in various shapes. Further, by regularly disposing the fine through-holes 34, it is possible to obtain the carbon nanotube (the field electron emission source) having dot-shaped patterns. In addition, since it is possible to form in various patterns, when it is used as the field electron emission source, it becomes unnecessary to form the conductive pattern of the substrate 31 into the predetermine shape and it makes it possible to use the plane electrode.

The methods described above are fairly simple and suitable for mass production. Further, in these methods, since the coarse single-walled carbon nanotube is dispersed into the solvent and then is solidified on the substrate, uniformity can be obtained in a lot. Accordingly, it is easy to scale-up this process.

The treating ad the depositing processes described above may be carried out after the coarse single-walled carbon nanotube has been pulverized using the mortar or the mixer for about several tens of seconds to several minutes. Moreover, after sonicating the beaker and dispersing the single-walled carbon nanotube into the solvent, the precipitates may be removed and the supernatant solvent may be evaporated naturally. As a result, the tip of the single-walled carbon nanotube gets exposed to the surface, which, in turn, allows the threshold voltage to be reduced and a large current density to be obtained.

Not by using the supernatant into which the coarse carbon nanotube is dispersed but by using remaining solution after removing the precipitate from the solution into which the coarse carbon nanotube is dispersed, the depositing process into the substrate may be carried out. In this case, by using the filter formed with openings having a predetermined diameter, it is possible to improve the purity of the single-walled carbon nanotube.

Further, by using the foregoing method, the coarse single-walled carbon nanotube having a high purity is stuck to and deposited on the substrate without being attached onto the inside of the beaker, whereas the coarse single-walled carbon nanotube having a low purity may tend to attach onto the inside of the beaker and may not adhere to the substrate.

By using the foregoing observation, the purity and the quality of the coarse single-walled carbon nanotube can be checked without separately inspecting the purity and the quality thereof.

The carbon nanotube film, i.e., the single-walled carbon nanotube deposited on the surface of the conductive substrate in accordance with the present invention may be used as a cathode of an electron tube such as a diode or triode (illuminate device), i.e., as the field emission electron source or the field emission electron source of the display tube used in a flat display panel.

Although the above discussions have been presented referring to a situation where the single-walled carbon nanotube is deposited on the conductive substrate, the multi-walled carbon nanotube may be deposited on the conductive substrate, or the single-walled or the multi-walled carbon nanotube may be deposited on an insulating substrate. In these cases, it has been found that, similar to the single-walled carbon nanotube, when the separated and the refined multi-walled carbon nanotube is deposited on the substrate, it is stuck to the substrate. Moreover, the single-walled or the multi-walled carbon nanotube may be deposited on both sides of the substrate. The carbon nanotube film obtained by the foregoing methods may be used for storing hydrogen or as an electrode of an electric cell.

Although the above discussions have been presented referring to a situation where as the solvent, the acetone is used, a liquid such as diethylether, water, ethanol may be used.

Further, as the metal substrate, copper, silver, nickel or titan or ITO, etc., may be used.

Although the above discussions have been presented referring to a situation where the solvent is naturally dried, the identical effect can be obtained by rapidly drying it, for example, by heating the solvent or by reducing the pressure. Further, the substrate may be taken out of the solution during the evaporation of the solvent and dried.

Although the above discussions have been presented referring to a situation where, after the solution and the substrate are disposed in the beaker, the carbon nanotube is deposited on the substrate, the carbon nanotube film may be obtained by dropping the solution incorporating therein the solvent into which the coarse carbon nanotube is dispersed on the exposed portion of the substrate using a scattering means such as a dropping pipet or a dispenser so as to evaporate the solvent.

To be more specific, first, the solution is obtained by dispersing the coarse carbon nanotube into the solvent such as the acetone and sonicating it. Subsequently, as shown in FIGS. 2 and 3, the substrate is formed with the exposed portion having the predetermined pattern by disposing the mask on the substrate. Next, the solution is scattered to the exposed portion of the substrate using the scattering means and then the solvent is evaporated. Thereafter, by removing the mask from the substrate, on the exposed portion of the substrate is deposited the carbon nanotube.

The method allows the carbon nanotube to be deposited only on the exposed portion of the substrate, which, in turn, minimizes the carbon nanotube deposited on the mask, thereby reducing the amount of the carbon nanotube used. Further, the thickness of the carbon nanotube deposited can be controlled by adjusting the amount of the carbon nanotube dropped onto the exposed portion of the substrate.

In this case, by repeatedly performing the scattering process of the solution having the carbon nanotube and the evaporating process of the solvent, the carbon nanotube may have a predetermined thickness.

In addition, by changing the thickness of the mask, the carbon nanotube may attain a predetermined thickness.

Consequently, when the carbon nanotube is used as the field emission electron source, it is possible for the carbon nanotube to have the thickness which is mot suitable for emitting the electrons.

As the foregoing solution, it is possible to use various solutions obtained by dispersing the coarse carbon nanotube into the solvent, or by concentrating it. For example, it is possible not only to use the supernatant obtained by dispersing the coarse carbon nanotube into the solvent and then removing the precipitate and to use the remaining solution after filtering the supernatant or the solution having the solvent into which the coarse carbon nanotube is dispersed, but also to use the solution obtained by dispersing the pulverized coarse carbon nanotube into the solvent.

The characteristics of the field emission electron source made of the single-walled carbon nanotube will be described in later.

The field emission electron source is manufactured by following processes. First, a beaker of 100 ml is prepared and then 50 mg of coarse single-walled carbon nanotube and 100 cc of acetone are put thereinto. Next, the beaker is sonicated so as to disperse the coarse carbon nanotube in the acetone. After separating the supernatant and the precipitate, the supernatant and the precipitate are poured into a pair of beakers in which a copper plate of 40×40×0.3 mm is, respectively, disposed at the bottom thereof. Thereafter, the beakers are put into the draft chamber so as to naturally evaporate the acetone. As a result, it is possible to obtain the copper plate having the surface on which the coarse single-walled carbon nanotube is deposited.

Figure 4:
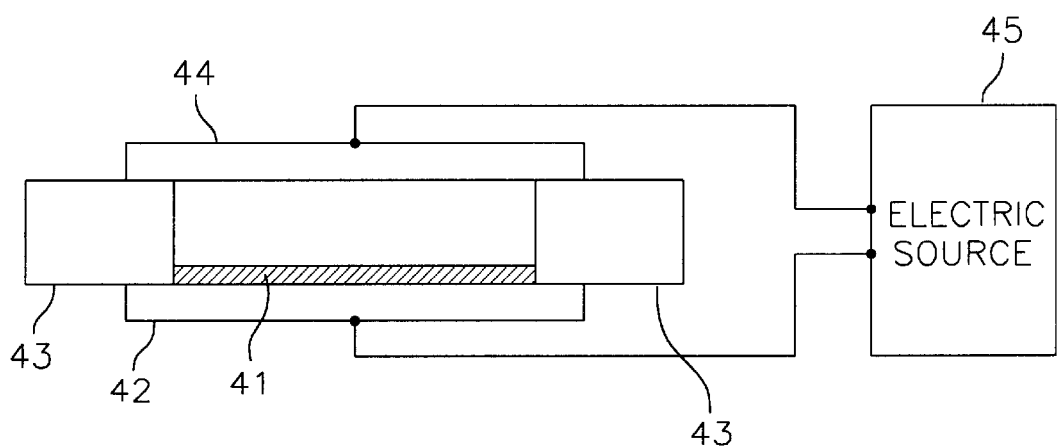
FIG. 4 offers a schematic representation of a diode structure in accordance with the present invention.

Subsequently, the obtained copper plate is cut into 5 mm×5 mm and, as shown in FIG. 4, is used as a cathode of a diode structure. That is, the copper plate 42 on which the coarse carbon nanotube 41 is deposited is installed so as to be opposite to an anode 44 through a spacer 43. Between the anode 44 and the copper plate 42, the voltage from the electric source 45 is applied.

In order to test the diode structure, it is put in a vacuum chamber. In this case, the backpressure is less than $2 \times 10^{-7}$ Torr. The used coarse single-walled carbon nanotube is obtained by the arc-discharge (AC 180A, helium pressure of 500 Torr) using a pair of carbon electrodes into which the mixture of Ni and Y is added. The test results are shown in FIG. 5.

From FIG. 5, it has been found that the precipitate incorporates therein impurities such as a catalyst metal or an amorphous carbon to reduce the electrons emitting efficiency, and the supernatant incorporates a relatively small amount of the impurity to efficiently emit the electrons. Accordingly, the characteristics of the field emission electron source manufactured by using only the supernatant will be described later.

Figure 6A:
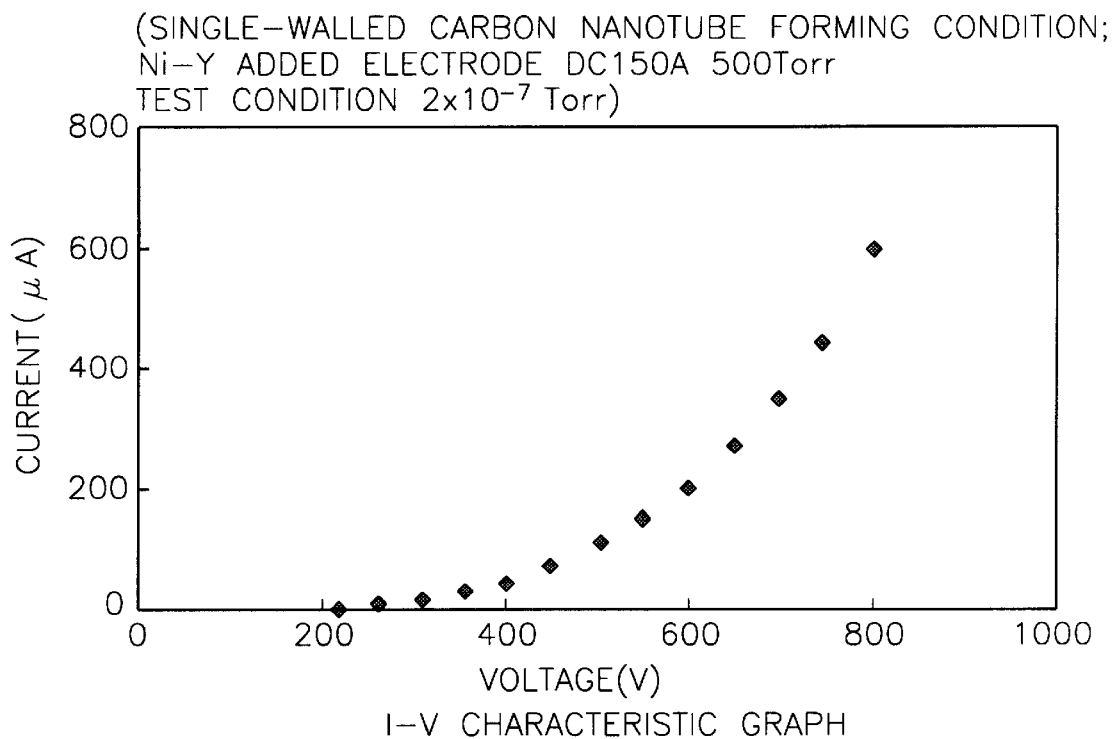
FIGS. 6A and 6B present characteristic graphs of a field emission electron source made of a carbon nanotube in accordance with the present invention.
Figure 6B:
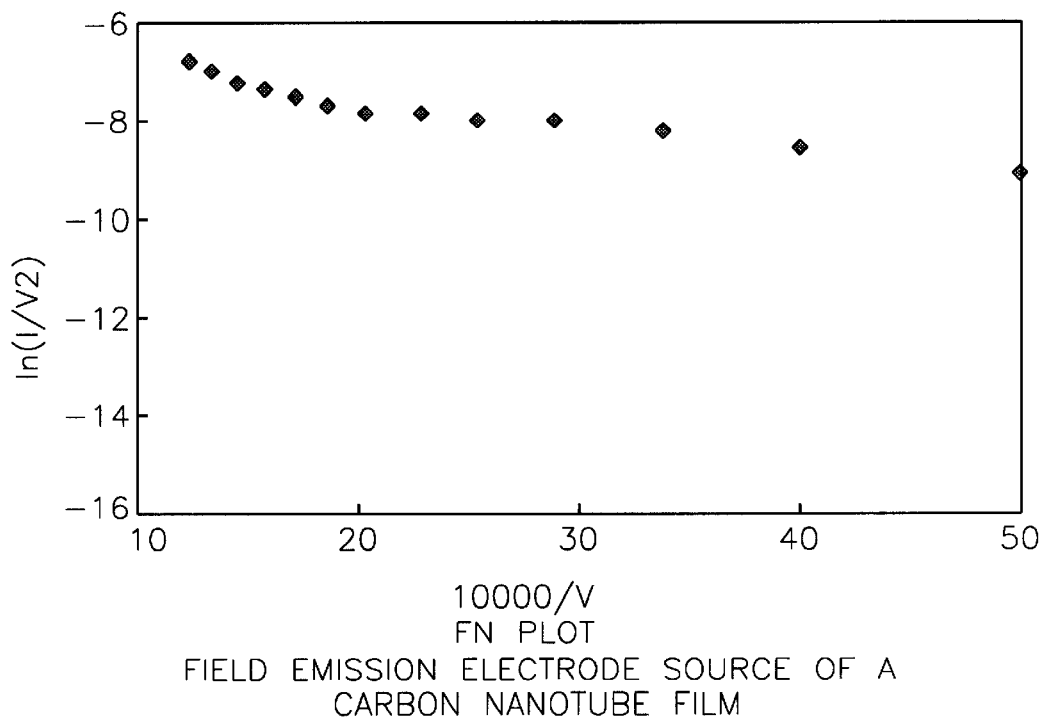

There are shown in FIGS. 6A and 6B, results of measuring the coarse single-walled carbon nanotube obtained by performing a typical DC arc-discharge using the carbon electrodes in which the Ni and Y are added and to which DC 150A flows, as the positive electrode.

In FIG. 6A showing I–V characteristic graph of the coarse single-walled carbon nanotube, when the voltage applied is more than 200V, the current begins to flow, and in FIG. 6B showing a FN plot, the FN plot is a substantially linear with a negative slope. Accordingly, it has been found that the single-walled carbon nanotube can be used as the field emission electron source.

Figure 7A:
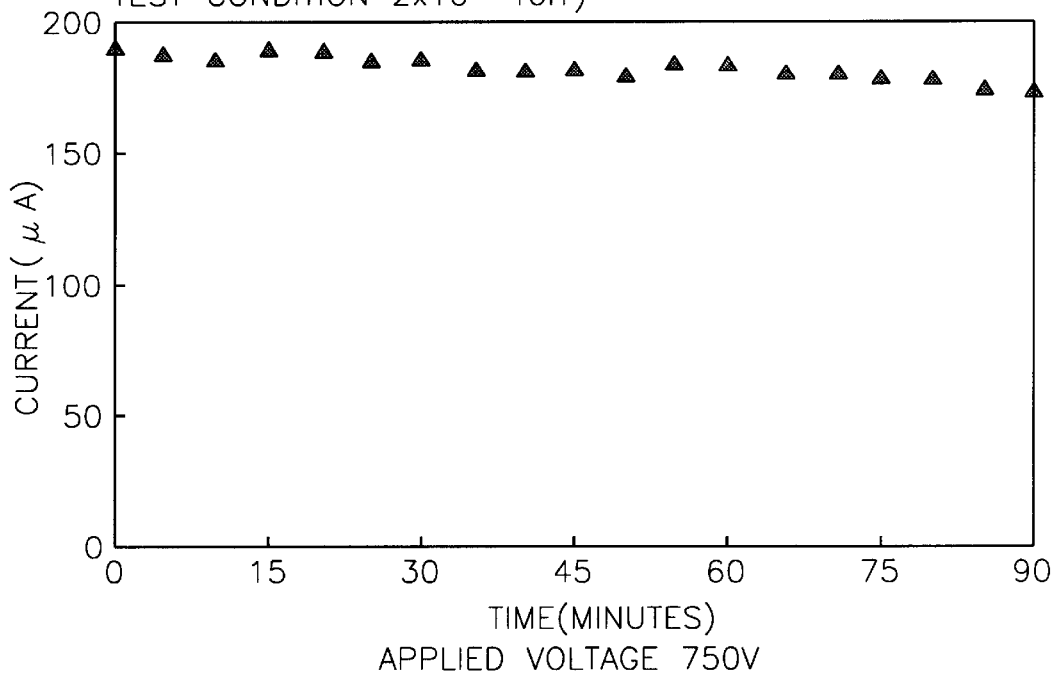
FIGS. 7A and 7B provide graphs of a current versus time of the field emission electron source made of a carbon nanotube in accordance with the present.
Figure 7B:
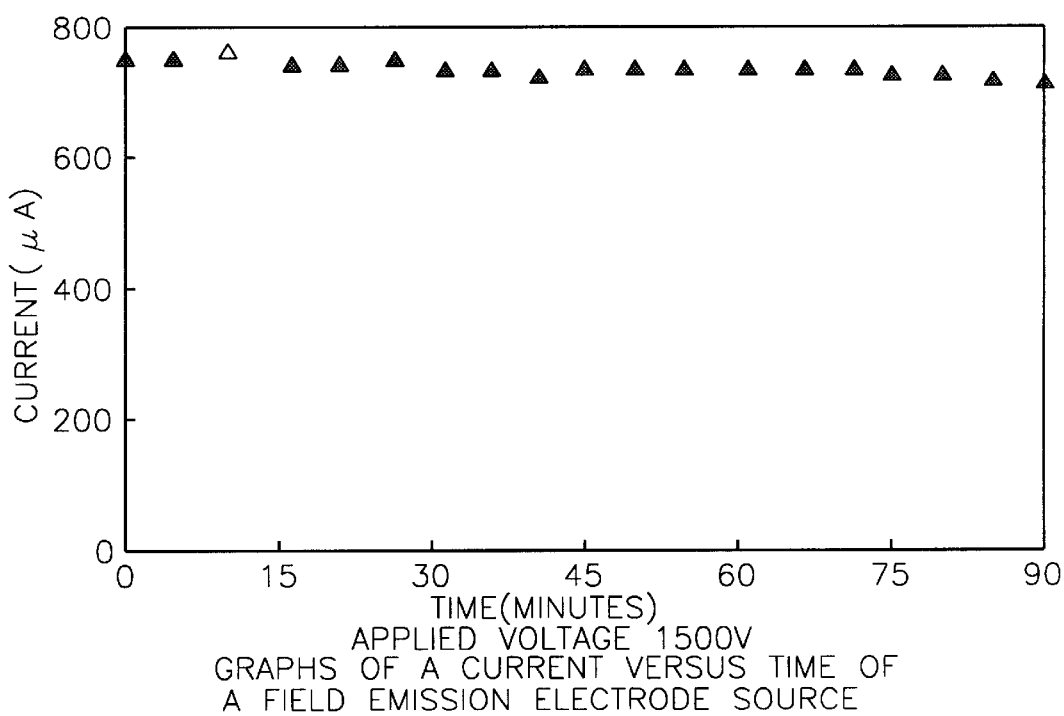

Moreover, there are shown in FIGS. 7a and 7b graphs of a current versus time of the field emission electron source using the single-walled carbon nanotube, the single-walled carbon nanotube being obtained by performing an alternating arc-discharge (AC180A, He pressure: 500 Torr).

As shown in FIGS. 7a and 7b, the single-walled carbon nanotube as the field emission electron source is stable for a prolonged period.

Figure 8:
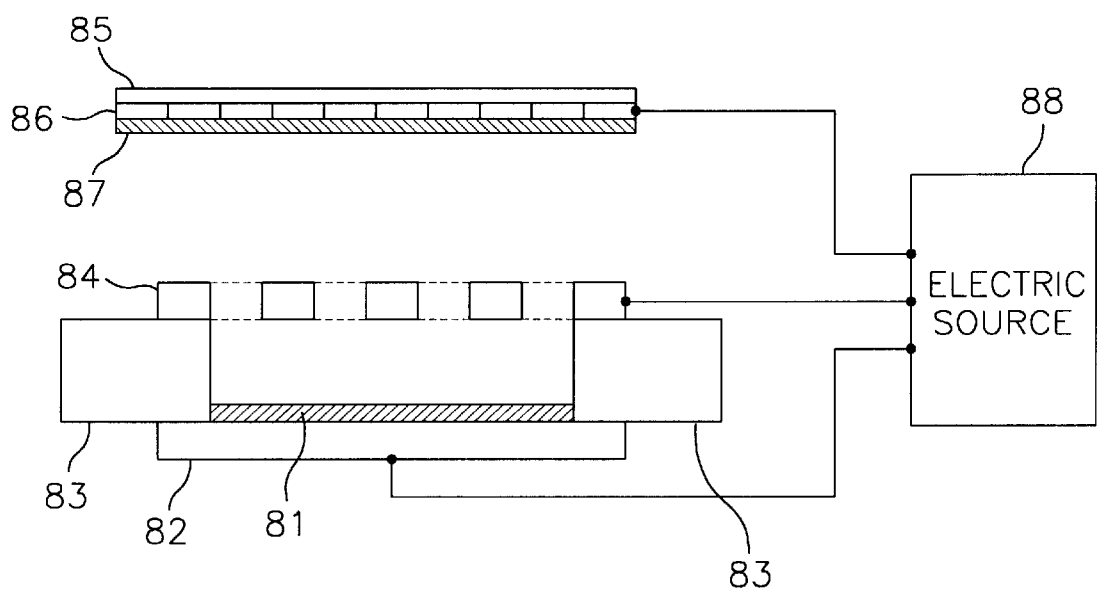
FIG. 8 exhibits a schematic representation of a triode structure in accordance with the present invention.

There is shown in FIG. 8 a triode structure. As shown, a copper plate 82 on which the single-walled carbon nanotube 81 is deposited is installed so as to be opposite to a grid 84 of a metal mesh through a spacer 83. Above it, a glass plate 85, an anode 86 provided at the glass plate 85, and a fluorescencer 87 coated on the anode 86 are provided. Under this condition, by applying the voltage from the electric source 88 between the anode 86 and the copper plate 82, it is possible to radiate the fluorescencer 87.

According the present invention, since after disposing the substrate having the exposed portion patterned into the predetermined shape in the solution into which the coarse carbon nanotube is dispersed, the carbon nanotube is deposited on the exposed portion of the substrate, it is easy to form the carbon nanotube film having a predetermined pattern.

Moreover, after the solution obtained by dispersing the coarse carbon nanotube into the solvent is scattered to the exposed portion of the substrate using the scattering means, the solvent is evaporated, thereby depositing the carbon nanotube on the exposed portion of the substrate. Accordingly, it is easy to form the carbon nanotube film having a predetermined pattern and to efficiently use the raw material thereof.

By using the carbon nanotube film obtained by using the inventive method as the field emission electron source, it is possible to provide the field emission electron source having the predetermined pattern at a low cost.

While the present invention has been described with respect to certain preferred embodiments only, other modifications and variations may be made without departing from the scope of the present invention as set forth in the following claims.

What is claimed is:

1. A method for forming a carbon nanotube film, the method comprising the steps of:

preparing a solution having a solvent into which a coarse carbon nanotube is dispersed;

disposing a substrate in the solution, the substrate having an exposed portion patterned into a predetermined shape; and depositing a carbon nanotube on the exposed portion of the substrate by evaporating the solvent.

2. The method of claim 1, wherein the depositing step is carried out using a supernatant obtained by removing a precipitate after dispersing the coarse carbon nanotube into the solvent.

3. The method of claim 1, wherein the deposing step is carried out using the solution obtained after dispersing the coarse carbon nanotube into the solvent or, a remaining solution obtained after filtering a supernatant, the supernatant being obtained by removing a precipitate after dispersing the coarse carbon nanotube into the solvent.

4. The method of claim 1, wherein the depositing step is carried out using a solution obtained after pulverizing a course carbon nanotube and dispersing the pulverized coarse carbon nanotube into a solvent.

5. The method of claim 1, wherein the substrate is a conductive plate.

6. A carbon nanotube film formed by using the method of claim 1.

7. A field emission electron source made of a carbon nanotube film by using the method of claim 1.

8. A method for forming a carbon nanotube film, the method comprising the steps of:
preparing a solution having a solvent into which a coarse carbon nanotube is dispersed;
preparing a substrate having an exposed portion patterned into a predetermined shape;
scattering the solution to the exposed portion of the substrate using a scattering means; and
depositing a carbon nanotube on the exposed portion of the substrate by evaporating the solvent.

9. The method of claim 8, wherein the scattering step and the evaporating step are repeatedly carried out.

10. The method of claim 8, wherein the solution is a supernatant obtained after dispersing the coarse carbon nanotube into the solvent and removing a precipitate therefrom.

11. The method of claim 8, wherein the solution is a solution obtained after dispersing the coarse carbon nanotube into the solvent or a remaining solution obtained after filtering a supernatant, the supernatant being obtained after dispersing the coarse carbon nanotube into the solvent and removing a precipitate therefrom.

12. The method of claim 8, wherein the solution is a solution obtained after pulverizing a coarse carbon nanotube and dispersing the pulverized coarse carbon nanotube into a solvent.

13. A carbon nanotube film formed by using the method of claim 5.

14. A field emission electron source made of a carbon nanotube film by using the method of claim 5.

* * * * *